March 29, 1955　　　F. J. KIRKMAN　　　2,705,252

DRY CELL BATTERY

Filed Oct. 1, 1953

INVENTOR.
Fredrick J. Kirkman
BY
Jones, Tesel & Darbo
Attys.

United States Patent Office 2,705,252
Patented Mar. 29, 1955

2,705,252

DRY CELL BATTERY

Fredrick J. Kirkman, Freeport, Ill., assignor to Burgess Battery Company, Freeport, Ill., a corporation of Delaware Application October 1, 1953, Serial No. 383,443

9 Claims. (Cl. 136—111)

This invention relates to dry cell batteries. More particularly, it relates to flat cell batteries of small size having an improved stack arrangement of flat cells. Specifically, the invention relates to a series-connected flat cell battery having a cell stack comprised of a plurality of composite cell units and independent slabs of depolarizer mix stacked in proper order in juxtaposed laminar arrangement. The battery of the invention is adapted for use in portable electronic equipment where the small size of the power supply is an important factor in design.

In small batteries of the character described, there are a number of problems, one of which is the isolation of the electrolyte of the individual cells whereby there is no leakage of electrolyte from one cell to another with resulting short circuits. Another problem is the separation of the depolarizer mix from the negative electrode of each cell whereby particles of mix do not come in contact with the electrode and cause short circuits and local action. Another problem is to provide adequate space for the active materials, and another problem is to provide highly conductive electrical connections between the cells which are rugged and durable and capable of withstanding the jarring and other stresses which occur during shipping, handling and use. In addition to providing a small battery which is satisfactory from the performance standpoints mentioned, there is also the problem of providing a construction which is simple and economical as to structure and method of fabrication and which lends itself to rapid machine production.

An object of this invention is to provide an improved battery construction of the character described in which the problems mentioned hereinabove are satisfactorily met.

More particularly, it is the object of the invention to provide a cell stack arrangement wherein a maximum amount of space is provided for active materials, the electrolyte of the individual cells is effectively isolated, and the depolarizing mix is prevented from coming in contact with the negative electrode.

A further object is to provide a battery construction that is simple and economical from the standpoint of structure, materials and cost of fabrication, and which lends itself to rapid machine production.

A specific object is to provide a battery having a cell stack arrangement comprising alternate composite cell units and masses of depolarizer mix.

Further objects and advantages will become apparent from the following description which is to be taken in conjunction with the accompanying drawings, in which Fig. 1 is a plan view of a negative electrode and an associated bibulous separator, adapted for use in a battery in accordance with the invention;

Figure 1:
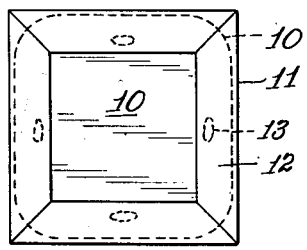
Figure 4:
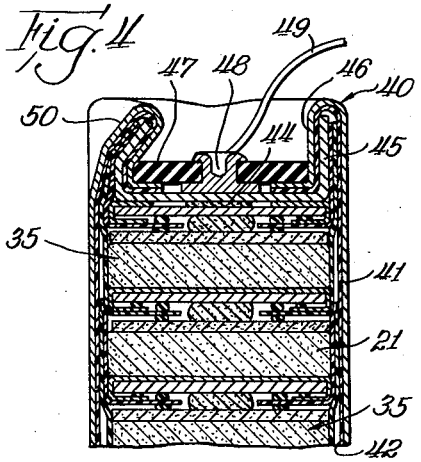
Fig. 4 is a longitudinal view, partly in section, of an embodiment of a multiple-cell battery in accordance with the invention, taken along broken line 4—4 of Fig. 5.
Figure 2:
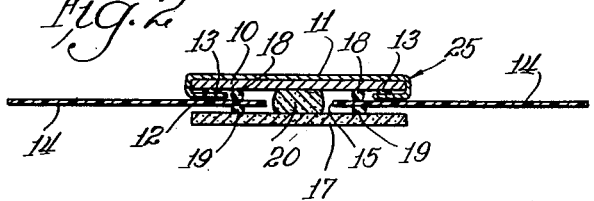
Fig. 2 is a sectional elevation of a composite electrode unit employing the negative electrode and associated separator shown in Fig. 1.

Referring to Figs. 1 and 2, the negative electrode or anode 10 is a thin, flat, plate-form element substantially square in shape with rounded corners, composed of a suitable negative metal such as zinc. The shape factor is not important in the present invention and any suitable shape may be used, such as round, oval, rectangular, etc.

Parallel and adjacent to a broad surface of anode 10 is a non-conductive, bibulous sheet-form separator 11 which may be composed of the usual paper such as blotting paper. Bibulous separator 11 covers one broad surface of anode 10, which is designated as the front surface, and has an extending peripheral margin 12 folded around the edges of anode 10 and against the marginal portions of the back surface of the anode, leaving exposed a substantial area of said latter surface. Marginal folds 12 are attached to anode 10 in a suitable manner as by an adhesive, and such attachment may be throughout the area of the folds or at a plurality of local areas as the local areas 13.

Adjacent to the back surface of anode 10 is a thin, flexible, electrolyte-impervious, dielectric, thermoplastic sheet or film 14 which may be composed of polyethylene, the co-polymer of vinyl-chloride and vinyl-acetate or the rubber hydrochloride product known as "Pliofilm." Sheet 14 has the property of adhering to itself upon the application of heat. It has a substantially greater area than anode 10 whereby a continuous peripheral margin of the sheet extends beyond the edges of the anode. Sheet 14 has an aperture 15 disposed centrally thereof, the arrangement being such that anode 10 overlies the aperture and a portion of the back surface of the anode is exposed at the aperture.

Parallel and adjacent to the opposite broad surface of sheet 14 and also overlying aperture 15 is thin, flexible, plate-form positive electrode 17. Electrode 17 has substantially the same lateral size and shape as the negative electrode 10 and is in vertical alignment therewith. It may be composed in the known manner of particles of conductive carbon or graphite in a suitable binder such as polyisobutylene. Other forms of carbonaceous electrodes may also be used, such as a flexible fabric or cloth impregnated with a conductive carbonaceous composition.

Encircling aperture 15 and positioned between the anode 10 and dielectric sheet 14 is a ring 18 of electrolyte-resistant, adhesive-plastic material such as tar, pitch, asphalt or the like. Ring 18 adhesively joins the covered negative electrode to the dielectric sheet and acts as a sealing member, the latter function being described more fully hereinafter.

Also encircling aperture 15 and positioned between dielectric sheet 14 and positive electrode 17 is a second adhesive plastic ring 19 similar in composition to ring 18 and adhesively joining said electrode 17 to said sheet 14. In practice rings 18 and 19 are applied to electrodes 10 and 17 respectively prior to the assembly with sheet 14.

The two electrodes 10 and 17 are electrically connected by a mass 20 of conductive, electrolyte-resistant, adhesive-plastic material, which may be composed of finely divided silver particles in a wax-like binder-lubricant such as microcrystalline wax, paraffin wax or the like, as disclosed in the copending application of Sam Kurlandsky, Serial No. 161,892, filed May 13, 1950, now Patent No. 2,666,803. In the preferred practice, part of said mass 20 is applied while hot and soft to the exposed surface of the negative electrode 10 and the other part is applied in the same manner to positive electrode 17 prior to assembly of the composite electrode unit. In the assembly of said unit, the electrodes 10 and 17 are pressed together and the two portions of the mass 20 merge together. The hot application of the mass 20 described provides an intimate, adhesive contact with both electrodes, with the result that a highly conductive, rugged and durable intercell connection is obtained. For convenience, the assembled composite electrode unit shown in Fig. 2 is herein designated by the numeral 25.

In accordance with the present invention, a composite cell unit is formed of two composite electrode units 25 with a slab of depolarizer mix between them. To form a composite cell unit, an electrode unit 25 is inserted in the bottom of a recess 26 of a die or jig 27 with the bibulous separator 11 toward the top. The impervious sheet 14 of said electrode unit folds upwardly along the wall of recess 26 and outwardly upon the top of die 27. A slab 21 of depolarizer mix is then inserted on top of

Figure 5:
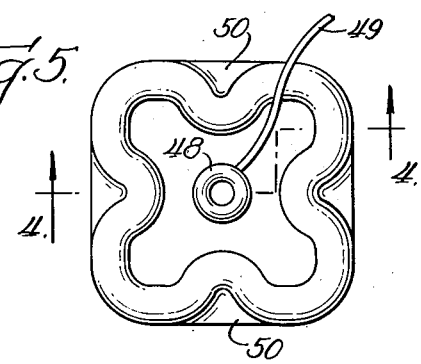
Fig. 5 is an end view of the battery shown in Fig. 4.
Figure 3:
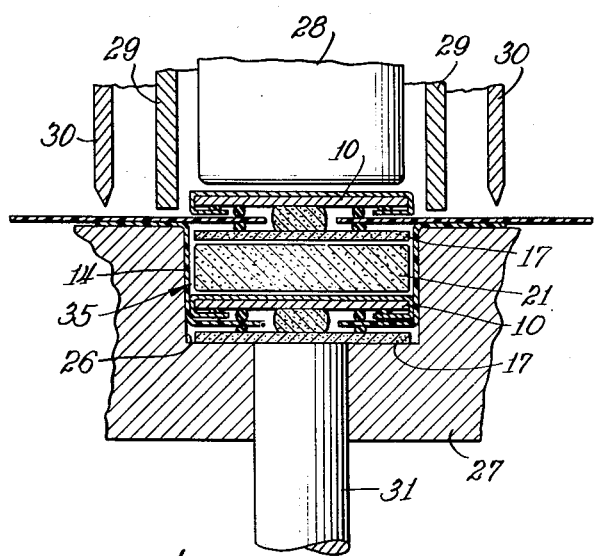
Fig. 3 is a sectional elevation of a composite cell unit in accordance with the invention, utilizing two electrode units, and a mix cake, and illustrating a method of assembling such a composite cell unit.

50 may be as desired, there being one such crimp located substantially centrally of each side wall of the tray in the specific embodiment being described, as shown in Fig. 5. As stated hereinbefore, the same closure-terminal arrangement is provided at the other end of the casing 40 and will not be described. It is only necessary to apply a conductive mass to the exposed surface of the positive electrode 17 at the bottom of the stack to provide electrical connection with the metal tray, and the closure-terminal arrangement is then formed in the same manner as has been described. The closure structure which has been described is the subject of the copending application of Ray D. Arbogast, Serial No. 383,587, filed October 1, 1953.

If desired, the entire battery may be provided with a protective covering as by dipping in a bath of molten wax such as microcrystalline wax. Upon cooling the wax solidifies and forms a complete seal enclosure which protects the battery against handling and high relative humidity.

In the battery of the present invention, the zinc anodes are effectively separated from the depolarizer mixes so that it is not possible for particles of the mix to come in contact with the anode and create local couples. The bibulous separator 11 being folded around the edges and upon the margin of the back of the anode and being adhesively joined to said margin, the particles of mix are effectively prevented from coming in contact with the anode. The adhesive juncture of the impervious sheet 16 with the anode by means of the adhesive ring 18 also assists in preventing access of mix particles to the anode.

The cell structure of the invention also permits substantial leeway in the amount of mix, whereby control need not be exact and the amount may be varied to adapt the cell for a particular type of service. This flexibility is provided by employing a relatively wet mix which is soft, plastic and easily molded under pressure, and providing space laterally of the edges of the mix slab into which the mix can spread under the pressure of compacting the cells and battery. In the battery of the invention, when the stack of cells is compressed longitudinally, the mix cakes spread laterally until they come in contact with the cell walls formed by the sheets 14, and the overall length of the battery is determined by the aggregate amount of mix present in the entire battery.

In the battery of the present invention, the pressure created in compacting the stack of cells is distributed over a retaining means of relatively wide area and high strength since in each cell the envelope wall formed by the sheets 14 extends laterally outward to the wall of casing 40 whereby substantially the entire area and strength of the casing serves to fortify and strengthen the envelopes for the individual cells. Cells usually undergo expansion in use with resulting increase in internal pressure, and the retaining means of wide area and high strength is useful in resisting the forces created by such pressure. Such strengthened envelopes also resist the leakage of electrolyte from the individual cells.

The cells and battery of the present invention are also economical of space since the only separations between cells are the very thin sheets or films 14. As a result, a maximum amount of space within the casing is occupied by the active elements.

The battery is simple and economical from the standpoint of both structure and manufacture. All of the elements including the mix cake are initially in the form of sheets or strips which are blanked out to form the elements. Such a structure lends itself to rapid machine production, and the result is a battery or structural simplicity. Also, close control is easily obtained, and as one attribute of this, the openings 15 in the imperivous sheets 16 are easily caused to register with an exposed area of the negative electrodes 10 whereby positive intercell connections are obtained by means of the conductive masses 20, which connections are rugged and durable.

Figure 6:
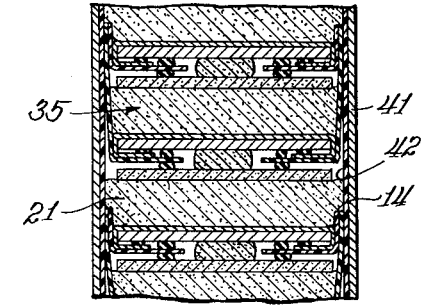
Fig. 6 is a view similar to Fig. 4 of a different embodiment of a battery in accordance with the invention.

In Fig. 6 is illustrated an embodiment of the battery of the invention which is similar to the embodiment of Figs. 1 to 5 with the difference that the peripheral margins of the sheets 14 are narrower with the result that they do not overlap the lower portion of the lower sheet 14 of the next-above composite cell unit but terminate at a point adjacent to the lateral surface of the independent mix slab 21. In such battery, the peripheral margins of the sheets 14 do not form envelopes for the cells containing the independent mix slabs, but sealed enclosures are formed for such cells by the interior wall of the casing 40 and the heat-welded junctures of said wall with the peripheral margins of the sheets 14 on either side of such cells. The parts of the battery of Fig. 6 are designated by the same numerals as are the corresponding parts of the battery of Figs. 1 to 5, and a separate description will not be given.

While only two embodiments of the invention have been described, the invention is not limited thereto and changes and modifications may be made within the spirit of the invention as will occur to those skilled in the art.

Invention is claimed as follows:

1. In a dry cell battery, a dielectric tubular casing having a thermoplastic interior surface, a stack of flat cell elements arranged in laminar relation and pressure contact in said casing, said stack comprising an alternate succession of composite cell units and indepenent slabs of depolarizer mix, said composite cell units each comprising an included slab of depolarizer mix sandwiched between a pair of electrode units; said electrode units each comprising a positive electrode, a negative electrode, a flexible, impervious dielectric, thermoplastic sheet between said electrodes, said sheet having an aperture therein and a peripheral margin extending beyond the edges of said electrodes, said electrodes overlying said aperture, an adhesive, plastic, conductive mass disposed within said aperture and between and electrically connecting said positive and negative electrodes, an adhesive, plastic ring disposed on each side of said thermoplastic sheet and encircling said aperture and attaching said sheet to said positive and negative electrodes respectively, and a bibulous, non-conductive sheet covering the surface of said negative electrode remote from said thermoplastic sheet and folded around the edges and covering and attached to the marginal portions of the other surface of said negative electrode; the peripheral margin of one thermoplastic sheet of a cell unit being folded along the lateral surfaces of the included mix slab thereof into engagement with and being heat-welded to the peripheral margins of the other thermoplastic sheet of said cell unit to form a sealing envelope for the cell included within said cell unit and to leave a positive electrode and a negative electrode externally of the opposite sides of said envelope respectively, and said united peripheral margins of the thermoplastic sheets of one cell unit extending along the lateral surfaces of the adjacent independent mix slab and into engagement with and being heat-welded to the peripheral margin of a thermoplastic sheet of the next cell unit to form a sealing envelope for the cell formed by said independent mix slab and the aforesaid external positive and negative electrodes, said peripheral margins of the thermoplastic sheets of said stack being heat-welded to the thermoplastic interior surface of said casing whereby said casing reinforces the cell envelopes formed by said thermoplastic sheets.

2. In a dry cell battery, a dielectric tubular casing having a thermoplastic interior surface, a stack of flat cell elements arranged in laminar relation and pressure contact in said casing, said stack comprising an alternate succession of composite cell units and independent slabs of depolarizer mix, said composite cell units each comprising an included slab of depolarizer mix sandwiched between a pair of electrode units; said electrode units each comprising a positive electrode, a negative electrode, a flexible, impervious, dielectric, thermoplastic sheet between said electrodes, said sheet having an aperture therein and a peripheral margin extending beyond the edges of said electrodes, said electrodes overlying said aperture, an adhesive, plastic, conductive mass disposed within said aperture and between and electrically connecting said positive and negative electrodes, an adhesive, plastic ring disposed on each side of said thermoplastic sheet and encircling said aperture and attaching said sheet to said positive and negative electrodes respectively, the peripheral margin of one thermoplastic sheet of a cell unit being folded along the lateral surfaces of the included mix slab thereof into engagement with and being heat-welded to the peripheral margins of the other thermoplastic sheet of said cell unit to form a sealing envelope for the cell included within said cell unit and to leave a positive electrode and a negative electrode externally of the opposite sides of said envelope respectively, and said united peripheral margins of the thermoplastic sheets water so as to render the technical application of water possible. Therefore, it is of no consequence which hydroxides or salts are employed provided that they are sufficiently water-soluble and neutral, i. e. they must not form stable addition products with the nitrogen compounds to be separated and that they do not undergo reaction with the nitrogen compounds. Especially suitable salts are, for instance, common salt, sodium sulphate, sodium carbonate, sodium phosphate, sodium acetate, sodium formate as well as the corresponding potassium salts and alkali hydroxides, such as sodium and potassium hydroxide. Further substances which may be employed, are described, for instance, in British specification No. 475,818. The said salt solution may contain according to the special requirements only small amounts of the salt or quantities up to saturation. On using alkali hydroxides, solutions containing from about 5% to about 40% of the hydroxide are preferred.

Which of the nitrogen compounds is preferably absorbed depends on the nature of the absorbent applied. Thus, the invention permits of adapting the process to the prevailing conditions of the various absorbents in the single steps of the reaction. On the other hand, it is possible to apply the absorbents in combination in the same step as far as they agree as to their separating activity. For instance, the weak acids may be employed in combination with neutral solvents boiling not substantially lower than the weak acid applied and being indifferent to the weak acid as well as to the nitrogen compounds and yielding homogeneous mixtures with the weak acid. Suitable solvents are for instance o-dichlorobenzene, 1.2.4-trichlorobenzene, nitrobenzene, tetralin, dekalin, higher boiling aliphatic or aromatic hydrocarbons as far as they are still liquid under the reaction conditions applied, as well as higher boiling ethers, alcohols, ketones and polyalcohols.

The application of mixtures of the weak acids with the organic solvents is especially advantageous in the separation of ammonia from mixtures containing methyl amines and in the separation of a mixture consisting of mono- and dimethylamine. Furthermore, it is possible in the separation of trimethylamine from methylamine mixtures being free of ammonia to increase the separating activity of the weak acids by addition of water. Of course, water must not be added in quantities exceeding saturation at the temperatures employed.

The process according to the invention may be advantageously carried out by a continuous method by feeding the reaction mixture, if desired under pressure, in a reaction tower counter-currently to the flow of the absorbent. By appropriately adjusting the flow velocity and the temperature one or more nitrogen compounds are selectively dissolved in the weak acids or in the said other absorbents applied whereas the nitrogen compounds not absorbed escape as vapours at the top of the reaction tower. The absorbed compounds are expelled from the absorbent as described above. By repeating the process once or several times each of the components contained in the starting mixture may be obtained in pure form.

The process herein described is substantially different from that disclosed in German Patent 615,527. German Patent 615,527 comprises the separation of trimethylamine and ammonia by treatment with acids in quantities insufficient for neutralization. The resultant salts cannot be decomposed again by merely heating or by reducing the pressure.

The invention is further illustrated by the following examples, without being restricted thereto.

*Example 1*

A mixture of 62.5% by volume of ammonia and 37.5% by volume of trimethylamine is passed through a liquid mixture of 25% by weight of phenol and 75% by weight of o-dichlorobenzene. At the beginning the mixture is completely absorbed. After saturation of the absorbent a mixture of 90% by volume of ammonia and 10% by volume of trimethylamine escapes. The mixture of ammonia and trimethylamine dissolved in the absorbent is expelled again by heating to 170° C. The mixture consists of 33% by volume of ammonia and 67% by volume of trimethylamine. By repeating the process several times, each of the two components is obtained in pure form.

*Example 2*

A mixture of ammonia and dimethylamine is introduced into a molten mixture of α- and β-naphthol, the proportion of the mixtures being 1:1. After saturation of the naphthol melt at about 90° C. with the bases a gas mixture consisting of 68% by volume of ammonia and 32% by volume of dimethylamine escapes. By repeating the process several times, each of the two components is obtained in pure form.

*Example 3*

400 parts by weight of a solvent mixture consisting of 25% by weight of phenol and 75% by weight of o-dichlorobenzene is saturated with a mixture consisting of 78% by volume of trimethylamine and 22% by volume of ammonia. 108 parts by weight of the mixture are totally absorbed. Thereupon pure trimethylamine is introduced into the saturated solution through a glass frit. The escaping gas mixture consists of 50% by volume each of ammonia and trimethylamine. As soon as the content of ammonia in the escaping gas decreases feeding of pure trimethylamine is stopped. By heating the solution 112 parts by weight of a 96.5% trimethylamine are obtained.

*Example 4*

M-cresol and a gas mixture of approximately equal parts by volume of ammonia, dimethylamine, and trimethylamine are contacted in countercurrent in an absorption tower packed with Raschig rings, said absorption tower having a length of 2.50 m. and a diameter of 3 cm. 45 liters of the aforesaid mixture and 120 grams of m-cresol are charged each hour. The gas escaping at the top of the tower consists of 99% ammonia whereas the mixture of methylamines expelled from the absorbent is almost free from ammonia.

*Example 5*

The mixture of dimethylamine and trimethylamine set free on heating the sump obtained according to Example 4 is contacted with m-cresol in an absorption tower as indicated in Example 4. About 48 liters of the mixture of the methylamines and 90 grams of m-cresol are charged each hour. 98% trimethylamine escapes at the top of the reaction tower whereas a 90% dimethylamine is obtained by heating the sump solution.

*Example 6*

A mixture consisting of 55% by volume of ammonia, 15% by volume each of mono-, di-, and trimethylamine is contacted in countercurrent with a technical cresol mixture (30 grams per hour) in an absorption tower packed with Raschig rings, said absorption tower having a diameter of 25 mm. and a height of 2.50 m.; the throughput of said mixture amounts to 30 liters per hour. The non-absorbed gas contains 100% of the amount of ammonia charged and 95% of the trimethylamine charged and is free from mono- and dimethylamine.

The mixture absorbed by the cresol and containing besides small amounts of trimethylamine, the whole mono- and dimethylamine is contacted after expelling from the solvent with a mixture consisting of 1 part by weight of phenol and 3 parts by weight of o-dichlorobenzene in the same reaction tower and in similar manner.

100% monomethylamine escapes at the top of the reaction tower whereas 92% dimethylamine is obtained from the sump solution.

*Example 7*

A mixture of 49% by volume of ammonia and 17% by volume each of mono-, di-, and trimethylamine at a rate of 29 liters per hour is contacted, in countercurrent, at room temperature with a caustic soda solution of 10% strength in an absorption tower packed with Raschig rings and having a height of 2.50 m. and a diameter of 25 mm. The gas mixture is fed at a point in the middle of the tower, the sump of the absorption tower is heated to 45° C. When charging 70 cm.³ of caustic soda solution per hour 100% trimethylamine is taken off from the top of the tower. The dissolved nitrogen compounds are practically free from trimethylamine.

The dissolved mixture of nitrogen compounds is expelled by heating and contacted in a similarly constructed tower with a technical cresol mixture of such an amount that the mono- and dimethylamine contained in the mixture are dissolved whereas pure ammonia escapes at the top of the tower.